US009021814B2

(12) United States Patent
Greeff (10) Patent No.: US 9,021,814 B2
(45) Date of Patent: May 5, 2015

(54) PROCESS FOR CO-PRODUCING SYNTHESIS GAS AND POWER

(75) Inventor: Isabella Lodewina Greeff, Johannesburg (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 794 days.

(21) Appl. No.: 13/322,144

(22) PCT Filed: May 20, 2010

(86) PCT No.: PCT/IB2010/052235
§ 371 (c)(1),
(2), (4) Date: Nov. 22, 2011

(87) PCT Pub. No.: WO2010/134037
PCT Pub. Date: Nov. 25, 2010

(65) Prior Publication Data
US 2012/0067060 A1 Mar. 22, 2012

Related U.S. Application Data

(60) Provisional application No. 61/180,724, filed on May 22, 2009.

(51) Int. Cl.
*F02C 3/28* (2006.01)
*C01B 3/36* (2006.01)
(Continued)

(52) U.S. Cl.
CPC ... *C01B 3/36* (2013.01); *F02C 3/28* (2013.01); *B01D 53/229* (2013.01);
(Continued)

(58) Field of Classification Search
CPC ............... F02C 1/04; F02C 3/28; F02C 3/28; F01K 23/068; Y02E 20/18
USPC ............ 60/39.12, 39.182, 774, 784, 780, 781
See application file for complete search history.

(56) References Cited

U.S. PATENT DOCUMENTS 4,178,758 A * 12/1979 Paull et al. ...................... 60/648
5,076,837 A 12/1991 Rathbone et al.
(Continued)

FOREIGN PATENT DOCUMENTS

EA 001466 4/2001
EP 0875282 A1 11/1998
(Continued)

OTHER PUBLICATIONS

Fiaschi, D. et al., "The air membrane-ATR integrated gas turbine power cycle: A method for producing electricity with low C02 emissions," Energy Conversion and Management, Elsevier Science Publishers, Oxford, GB, vol. 46, No. 15-16, Sep. 1, 2005, pp. 2514-2529, XP025378451 ISSN: 0196-8904 [retrieved on Sep. 1, 2005, p. 2516-p. 2525; figures 2, 7; tables 1-3.
(Continued)

*Primary Examiner* — William H Rodriguez
(74) *Attorney, Agent, or Firm* — McDermott Will & Emery LLP (57) ABSTRACT

A process for co-producing synthesis gas and power includes producing a synthesis gas comprising at least CO and $H_2$ by reacting a hydrocarbonaceous feedstock with oxygen, the synthesis gas being at a first temperature, separating air from a compressed air stream by means of at least one ion transport membrane unit thereby producing a permeate stream consisting predominantly of oxygen and a reject stream of oxygen-depleted air at a second temperature which is lower than the first temperature, indirectly heating the reject stream of oxygen-depleted air with the synthesis gas and at least partially expanding, the heated reject stream of oxygen-depleted air through at least one turbine to generate power, producing an at least partially expanded reject stream of oxygen-depleted air, and feeding at least a portion of the permeate stream consisting predominantly of oxygen to the synthesis gas generation stage to provide oxygen for production of synthesis gas.

12 Claims, 4 Drawing Sheets

(51) Int. Cl.
  *B01D 53/22* (2006.01)
  *C01B 13/02* (2006.01)
  *C10G 2/00* (2006.01)
  *C10J 3/00* (2006.01)
  *F02C 1/04* (2006.01)
  *F01K 23/06* (2006.01)
  *G21D 9/00* (2006.01)

(52) U.S. Cl.
  CPC ...... B01D 2256/12 (2013.01); B01D 2257/102 (2013.01); *C01B 13/0251* (2013.01); C01B 2203/0211 (2013.01); C01B 2203/0227 (2013.01); C01B 2203/0233 (2013.01); C01B 2203/0244 (2013.01); C01B 2203/025 (2013.01); C01B 2203/061 (2013.01); C01B 2203/062 (2013.01); C01B 2203/0838 (2013.01); C01B 2203/1241 (2013.01); C01B 2203/84 (2013.01); C01B 2210/0046 (2013.01); *C10G 2/32* (2013.01); *C10J 3/00* (2013.01); *F02C 1/04* (2013.01); *G21D 9/00* (2013.01); C10J 2300/093 (2013.01); C10J 2300/0959 (2013.01); C10J 2300/0976 (2013.01); C10J 2300/1659 (2013.01); C10J 2300/1678 (2013.01); C10J 2300/1884 (2013.01); *F01K 23/068* (2013.01); Y02E 20/18 (2013.01)

(56) References Cited

U.S. PATENT DOCUMENTS

| | | | |
|---|---|---|---|
| 5,388,395 A * | 2/1995 | Scharpf et al. | 60/781 |
| 5,865,023 A * | 2/1999 | Sorensen et al. | 60/775 |
| 5,901,547 A * | 5/1999 | Smith et al. | 60/773 |
| 5,942,203 A | 8/1999 | Van Dijk | |
| 8,372,251 B2 * | 2/2013 | Goller et al. | 204/196.37 |
| 2006/0248872 A1 * | 11/2006 | Bachovchin et al. | 60/39.12 |
| 2007/0082306 A1 * | 4/2007 | Drnevich et al. | 431/12 |
| 2009/0084035 A1 | 4/2009 | Wei | |
| 2009/0178338 A1 * | 7/2009 | Leininger et al. | 48/86 R |
| 2010/0170263 A1 * | 7/2010 | Steele et al. | 60/781 |
| 2011/0120139 A1 * | 5/2011 | Abraham et al. | 60/783 |
| 2011/0179801 A1 * | 7/2011 | Thacker et al. | 60/775 |

FOREIGN PATENT DOCUMENTS

| | | |
|---|---|---|
| GB | 2179056 A | 2/1987 |
| GB | 2237287 A | 5/1991 |
| JP | 2-197788 A | 8/1990 |
| JP | 2003-63808 A | 3/2003 |
| JP | 2005-533972 A | 11/2005 |
| JP | 2006-29125 A | 2/2006 |
| JP | 2009-85210 A | 4/2009 |
| RU | 2299175 C1 | 5/2007 |
| WO | 9748639 A1 | 12/1997 |
| WO | 2004/009965 A1 | 1/2004 |

OTHER PUBLICATIONS

Anonymous: "Integration of ITM oxygen with coal gasification, Fischer-Tropsch synthesis liquid fuels production," Research Disclosure, Mason Publications, Hampshire, GB, vol. 471, No. 4, Jul. 1, 2003, XP007132961 ISSN: 0374-4353, p. 1-p. 2.

Anonymous: "Power production in coal gasification combined cycle systems with integrated oxygen production," Research Disclosure, Mason Publications, Hampshire, GB, vol. 371, No. 53, Mar. 1, 1995, XP007120279 ISSN: 0374-4353, p. 1-p. 2; figure 2.

PCT International Search Report, International Application No. PCT/IB2010/052235, 4 pages.

* cited by examiner

PROCESS FOR CO-PRODUCING SYNTHESIS GAS AND POWER

CROSS-REFERENCES TO RELATED APPLICATIONS

The present application claims the benefit of International Patent Application Number PCT/IB2010/052235, entitled "PROCESS FOR CO-PRODUCING SYNTHESIS GAS AND POWER," filed on May 20, 2010, which is hereby incorporated by reference in its entirety for all purposes.

FIELD OF THE INVENTION

This invention relates to a process for co-producing synthesis gas and power.

BACKGROUND

Synthesis gas is a mixture which includes carbon monoxide (CO) and hydrogen ($H_2$). Synthesis gas is typically produced by one of two processes, either from solid feedstocks, such as coal, by gasification with oxygen and steam, or from gaseous feedstocks, such as natural gas, by reforming with oxygen (known as partial oxidation reforming) or water (known as steam reforming). A combination of partial oxidation and steam reforming, namely autothermal reforming, is also commonly applied. The oxygen required for the production of synthesis gas is usually obtained from air using conventional cryogenic air separation technology. The synthesis gas produced is used to produce a wide range of carbon based chemicals, e.g. methanol and liquid hydrocarbons via Fischer-Tropsch synthesis.

Synthesis gas production processes are energy intensive and contribute significantly to carbon dioxide emissions. Carbon dioxide is a major greenhouse gas, and its emission into the atmosphere is not environmentally friendly.

The problem of carbon dioxide emissions can be dealt with in various ways e.g. by carbon dioxide capture and sequestration, reduction of carbon dioxide emissions via improvement of thermal efficiency and substitution of conventional carbon based power and heat generation facilities with a non-carbon source, e.g. nuclear energy.

Synthesis gas production processes operate at elevated temperatures and, depending on the type of technology used to generate the synthesis gas, can produce a hot synthesis gas at a temperature above 900° C. Heat is typically recovered from the hot synthesis gas using waste heat boilers producing steam. This steam is typically used to drive steam turbines for cryogenic air separation units and/or to produce electrical power. It is important to note that conventional cryogenic air separation processes consume significant quantities of power. Heat recovery using waste heat boilers also contribute considerably to second law thermodynamic losses in processes producing the synthesis gas due to large temperature difference driving forces used in such waste heat boilers. In other words, the use of waste heat boilers downgrades high quality or high temperature heat to a lower quality or lower temperature heat which is undesirable, as heat at a higher temperature can be used to produce more power compared to the same amount of heat at a lower temperature. High temperature difference driving forces reduce overall thermal efficiency of a process and therefore potentially worsens the problem of carbon dioxide emissions.

One way to reduce large temperature difference driving forces in waste heat boilers would be to raise the steam pressure or to superheat the steam. However, the fact that the critical temperature of water is 374° C. places an upper limit on the temperature at which saturated steam can be produced in waste heat boilers. Also, when using steam to generate power in e.g. a Rankine cycle, steam is typically not superheated to temperatures above 565° C. because of material of construction considerations.

Attempts to reduce carbon dioxide emissions via thermal efficiency improvements should therefore focus on addressing the problem of high temperature difference driving forces and also on reducing the power consumption of cryogenic air separation processes. However, since cryogenic air separation is a mature technology, only incremental reductions in cost and power consumption are expected. An alternative process for separating oxygen from air is the use of Ion Transport Membranes (ITM's). The ITM oxygen process uses ceramic membranes operated at high temperature (typically 760-930° C.) to separate the oxygen from air. It is believed that the ITM oxygen technology could significantly lower the cost of oxygen production. This high temperature oxygen-producing process lends itself to integration with processes wherein oxygen, power and steam are required. In an ITM oxygen process ceramic membranes separate oxygen from air at high temperature in an electrochemically driven process. The oxygen in the air is ionized on an upstream surface of the ceramic and diffuses through the membrane as oxygen ions driven by an oxygen partial pressure gradient, forming oxygen molecules on a downstream side of the membrane. The ITM oxygen process produces a hot, substantially pure oxygen stream or permeate stream and a hot, pressurised oxygen-depleted stream or reject stream from which significant amounts of energy can be extracted. The effective use of this energy in the overall operation of an ITM oxygen process is necessary for the system to be competitive with conventional cryogenic air separation technology. The energy recovery and effective use thereof are possible by integration of compressors, gas turbines, hot gas expanders, steam turbines and heat exchangers with the membrane module.

Research and development on nuclear-assisted synthesis gas generation processes have thus far attempted to match the synthesis gas generation process operating temperature with the highest temperature heat that can be made available from a nuclear reactor loop. High temperature gas cooled nuclear reactors are able to provide heat at temperatures of about 750-950° C. At these comparatively low temperatures, reasonable synthesis gas generation process options are limited, especially when a gasification process is employed.

Synthesis gas generation processes typically form part of large-scale facilities producing carbon-based chemicals. Such facilities typically include further processing steps operating at temperatures below 800° C. or even more typically below 500° C. Although these further processing steps may be promising candidates for heat integration with nuclear heat sources, it was found that these further processing steps are also promising candidates for heat integration with hot synthesis gas produced in a synthesis gas generation process. It has also been found that in such facilities at temperatures below about 250° C. there typically is a number of sources and sinks of heat, with the heat sources becoming numerous with decreasing temperature. There is thus typically an excess of available lower grade heat. Consequently there is little incentive to rather provide low grade heat from a nuclear source. A more conventional light-water nuclear reactor would probably be the preferred choice for supplying low grade heat. There is thus a perceived lack of opportunities for integrating a nuclear heat source with large-scale facilities producing carbon-based chemicals, and particularly so for integrating a nuclear heat source with a synthesis gas generation process. This has led to significantly different strategies for using nuclear energy, most notably nuclear driven hydrogen production through water splitting. Embodiments of the present invention in contrast propose a new and different approach.

SUMMARY OF THE INVENTION

According to the invention, there is provided a process for co-producing synthesis gas and power, the process including: in a synthesis gas generation stage, producing a synthesis gas comprising at least CO and $H_2$ by reacting a hydrocarbonaceous feedstock with oxygen, the synthesis gas being at a first temperature; in an air separation stage, separating air from a compressed air stream by means of at least one ion transport membrane unit thereby producing a permeate stream consisting predominantly of oxygen and a reject stream of oxygen-depleted air at a second temperature which is lower than the first temperature; indirectly heating the reject stream of oxygen-depleted air with the synthesis gas and at least partially expanding said heated reject stream of oxygen-depleted air through at least one turbine to generate power, producing an at least partially expanded reject stream of oxygen-depleted air; and feeding at least a portion of the permeate stream consisting predominantly of oxygen to the synthesis gas generation stage to provide oxygen for production of synthesis gas.

DESCRIPTION OF DRAWINGS

The invention will now be described, by way of example, with reference to the accompanying diagrammatic drawings in which.

DETAILED DESCRIPTION

According to the invention, there is provided a process for co-producing synthesis gas and power, the process including:

in a synthesis gas generation stage, producing a synthesis gas comprising at least CO and $H_2$ by reacting a hydrocarbonaceous feedstock with oxygen, the synthesis gas being at a first temperature;

in an air separation stage, separating air from a compressed air stream by means of at least one ion transport membrane unit thereby producing a permeate stream consisting predominantly of oxygen and a reject stream of oxygen-depleted air at a second temperature which is lower than the first temperature;

indirectly heating the reject stream of oxygen-depleted air with the synthesis gas and at least partially expanding said heated reject stream of oxygen-depleted air through at least one turbine to generate power, producing an at least partially expanded reject stream of oxygen-depleted air; and feeding at least a portion of the permeate stream consisting predominantly of oxygen to the synthesis gas generation stage to provide oxygen for production of synthesis gas.

Typically the synthesis gas produced in the synthesis gas generation stage is at a temperature of at least 900° C. Typically the reject stream of oxygen-depleted air is available at a temperature of at least 600° C., more typically at least 700° C., but less than the temperature of the synthesis gas produced in the synthesis gas generation stage. In this manner, the reject stream of oxygen-depleted air thus provides a heat sink for the high temperature heat available from the synthesis gas, with the high temperature difference driving forces typically encountered where waste heat boilers are employed as a heat sink being reduced.

In this specification, it is intended that the term "turbine" includes the concept of a turbine stage, so that when there is a reference to more than one turbine, it is to be understood that the turbines may be separate units, or a single unit comprising more than one clearly identifiable turbine stage, or a combination of separate units and one or more single units comprising more than one clearly identifiable turbine stage. Also in this specification, indirect transfer of heat, e.g. "indirectly heating", means that heat is transferred across a heat transfer surface from one fluid to another, so that the fluids are not in direct contact with each other and are therefore not mixed.

The process may include heating the compressed air stream to a temperature of at least 700° C. prior to separation of the compressed air stream in the air separation stage. This heating may be done, for example, by burning a fuel such as a combustible gas or coal or any suitable combination of these methods. In a preferred embodiment of the invention, the compressed air stream is heated at least by transferring heat from a nuclear reaction stage. This preferred embodiment has the advantage of substituting conventional carbon based heating with a non-carbon source.

The at least one ion transport membrane unit thus employs a selectively permeable non-porous ion transport membrane, typically a plurality of such membranes. These membranes are usually of an inorganic oxide ceramic material, such as zirconia or other materials known to those skilled in the art. Typically, the membranes are in the form of tubes, sheets or a monolithic honeycomb structure. It is expected that the invention will employ an oxygen partial pressure differential across the membranes thereby to cause oxygen ions to migrate through the membranes from a feed side to a permeate side, where the ions recombine to form electrons and oxygen gas. It is in principle however also possible to employ a voltage differential across the membranes, i.e. by using ion transport membranes of the electrically-driven type, in which the electrons flow from the permeate side to the feed side of the membrane in an external circuit driven by a voltage differential. As will be appreciated, any solid ceramic membrane material which selectively permeates oxygen in the form of oxygen ions, whether of a mixed conductor type using an oxygen partial pressure differential, or a solid electrolyte type using a voltage differential across the membrane, can be used in the invention.

The reject stream of oxygen-depleted air is thus used as a working fluid. This working fluid may be expanded in a power generation stage of the process of the invention. The power generation stage thus employs the well-known Brayton cycle in which the working fluid is gaseous and is not condensed during the cycle. The Brayton cycle of the power generation stage thus effectively receives heat for power generation from at least the synthesis gas (this is the heat transferred to the reject stream of oxygen depleted air), and in some embodiments also from said nuclear reaction stage (this is the heat transferred to the compressed air stream prior to separation thereof. In embodiments including such heat transfer from a nuclear reaction stage, heat is typically transferred from a gaseous coolant of the nuclear reaction stage to the compressed air stream in indirect heat transfer fashion. This type of Brayton cycle is also referred to as being indirect, since the gaseous coolant of the nuclear reaction stage is typically re-circulated in a primary loop which is closed, with heat transferred from the primary loop to the compressed air stream of the indirect Brayton power cycle contained in a secondary loop. The secondary loop is an open loop cycle, i.e. a cycle in which the working fluid is used on a once-through basis with expanded working fluid being discharged from the process.

In a preferred embodiment of the invention, the nuclear reaction stage employs a high temperature gas cooled nuclear reactor in which a gaseous coolant is used for the nuclear reactor. Helium under elevated pressure, e.g. 70 bar(g), is a gaseous coolant that is typically used. Thus, typically the gaseous coolant circulated in the primary loop is helium. Typically, the gaseous coolant is at a temperature between about 750 and about 950° C., preferably at a temperature between about 800 and about 900° C., e.g. about 900° C., at an inlet of a heat exchanger arrangement used to transfer heat from the gaseous coolant of the nuclear reaction stage to the compressed air stream in indirect heat transfer fashion.

The process may include reheating the reject stream of oxygen-depleted air at least once, after partial expansion of the reject stream of oxygen-depleted air through said at least one turbine, and further expanding the reheated reject stream of oxygen-depleted air through at least one further turbine, in order to increase the efficiency of power generation. Reheating the reject stream of oxygen-depleted air thus typically involves heat addition to, and expansion of, the reject stream of oxygen-depleted air in steps, i.e. heating the reject stream of oxygen-depleted air with a portion of available heat and then expanding the reject stream of oxygen-depleted air to a first lower pressure, thereafter heating the reject stream of oxygen-depleted air again and expanding the reject stream of oxygen-depleted air again to a second lower pressure, with the second lower pressure being lower than the first lower pressure. Thus, in one embodiment of the invention, the concept of reheating is applied, i.e. the heating of the reject stream of oxygen-depleted air using synthesis gas is performed in multiple steps by staging the heating and the expansion of the heated or reheated reject stream of oxygen-depleted air. In such an embodiment, the power generation stage may thus employ at least two turbines, with at least a portion of the heat from the synthesis gas being transferred to the reject stream of oxygen-depleted air after the reject stream of oxygen-depleted air has passed through one turbine but before the reject stream of oxygen-depleted air passes through another turbine, thereby to reheat the reject stream of oxygen-depleted air. In another embodiment the reheating may also be done using a heat source other than the synthesis gas, e.g. nuclear energy or burning of fuel gas.

The process may include cooling said at least partially expanded reject stream of oxygen-depleted air, after it has been used for power generation, in heat transfer relationship with the compressed air stream. In embodiments of the invention including heat transfer from a nuclear reaction stage to the compressed air stream as discussed hereinbefore, this cooling of said at least partially expanded reject stream of oxygen-depleted air thus may include preheating the compressed air stream before the compressed air stream is heated with heat from the nuclear reaction stage. In other words, the process of the invention may thus effectively employ a recuperative or regenerative Brayton power cycle.

The process of the invention may thus include in the power generation stage, expanding said heated reject stream of oxygen-depleted air through at least one gas expander turbine producing an at least partially expanded reject stream of oxygen-depleted air at a lower temperature and a lower pressure than the heated reject stream of oxygen-depleted air. The at least one gas expander turbine may then be employed to generate electrical power, e.g. using a generator.

The process of the invention may include compressing air to produce the compressed air stream. The at least one gas expander turbine may be employed to drive at least one compressor to produce the compressed air stream.

Typically, the compressed air is at a pressure of at least 4 bar(g), more preferably between about 5.5 bar(g) and about 21 bar(g), e.g. about 15 bar(g).

Preferably, the compressed air stream is at a temperature of at least about 750° C., more preferably at least about 800° C., most preferably at least about 825° C., e.g. about 850° C., prior to separation thereof in the air separation stage. As will be appreciated, the reject stream of oxygen-depleted air from the ion transport membrane unit will also be at substantially these temperatures, before being heated with the synthesis gas to form the heated reject stream of oxygen-depleted air.

The heated reject stream of oxygen-depleted air may be at a temperature of at least 900° C., preferably at least about 1000° C., more preferably at least about 1100° C., most preferably at least about 1150° C., e.g. about 1200° C., before being at least partially expanded to generate power. As will be appreciated, the maximum temperature achievable for the heated reject stream of oxygen-depleted air is determined by the temperature of the synthesis gas. Preferably, the synthesis gas is thus at a temperature as high as practically possible, e.g. about 1300° C.

In any event, the synthesis gas is preferably at a temperature sufficiently high to ensure that the heated reject stream of oxygen-depleted air is heated to a temperature of at least 900° C.

Instead, or in addition, the process of the invention may include using said at least partially expanded reject stream of oxygen-depleted air to generate steam. The steam may be employed to generate additional power by means of a steam turbine. The power generation stage may thus be configured as a combined cycle. In a combined cycle heat is transferred from the expanded working fluid of the Brayton cycle (a so-called topping cycle) to the working fluid of a further power cycle (a so-called bottoming cycle). Typically the bottoming cycle is a Rankine cycle, typically using steam as working fluid. Combined cycle power systems are known to achieve increased efficiencies when compared to stand-alone Brayton cycles.

When the power generation stage is configured as a combined cycle, the Rankine cycle may also be modified to include the step of reheating and/or superheating of the working fluid of the Rankine cycle to further increase efficiency. Reheating or superheating may be done using either synthesis gas or nuclear heat, or combustion of fuel gas.

When the power generation stage is configured as a combined cycle, using steam as working fluid, a portion of the steam generated may be directed towards process heating, rendering the process of the invention a process for co-producing synthesis gas, power and heat. Alternatively, process steam generated in a facility utilising the synthesis gas may be fed into the Rankine cycle to supplement power production.

The air may be compressed in one or more air compressors sized to compress air in addition to what is required to produce the permeate stream consisting predominantly of oxygen in the air separation stage for synthesis gas generation purposes. The additional compressed air typically bypasses the ion transport membrane unit and is heated before being used to produce additional power.

The additional compressed air may receive heat from the nuclear reaction stage and/or from the synthesis gas. Typically, the additional compressed air, after having been heated, is then expanded to produce power.

Alternatively, fuel gas may be burned with the additional compressed air producing combusted gas, with the combusted gas being expanded to produce power. The additional compressed air may first be mixed with the reject stream of oxygen-depleted air and fuel before the mixture is combusted to produce combusted gas, with the combusted gas then being expanded through a gas expansion turbine to generate power. Preferably, the process includes in such a case first mixing the additional compressed air and the reject stream of oxygen-depleted air and then heating the mixture using the synthesis gas, before the heated mixture is mixed with fuel gas for combustion.

As will be appreciated, the permeate stream consisting predominantly of oxygen has a reduced pressure due to a pressure differential across the ion transport membrane unit. The process thus typically includes recompressing the permeate stream consisting predominantly of oxygen to a pressure suitable for use in the synthesis gas generation stage.

The process of the invention may include in a hydrocarbon synthesis stage, producing hydrocarbons from the synthesis gas produced by the synthesis gas generation stage. Examples of such hydrocarbon synthesis include methanol synthesis and Fischer-Tropsch synthesis. The synthesis gas generation stage should thus produce synthesis gas at a pressure which is sufficiently high, taking into account pressure losses over process units to allow hydrocarbon synthesis at a suitably high pressure. Typically, the synthesis gas is at a pressure of between about 40 bar(g) and about 50 bar(g), e.g. about 45 bar(g).

Synthesising hydrocarbons from the synthesis gas may be effected in any conventional fashion. Typically, the synthesising of hydrocarbons from the synthesis gas includes Fischer-Tropsch synthesis using one or more Fischer-Tropsch hydrocarbon synthesis stages, producing one or more hydrocarbon product streams and a Fischer-Tropsch tail gas which includes $CO_2$, CO and $H_2$.

The one or more Fischer-Tropsch hydrocarbon synthesis stages may be provided with any suitable reactors such as one or more fixed bed reactors, slurry bed reactors, ebullating bed reactors or dry powder fluidised bed reactors. The pressure in the reactors may be between 1 bar(g) and 100 bar(g), typically below 45 bar(g), while the temperature may be between 160° C. and 380° C.

One or more of the Fischer-Tropsch hydrocarbon synthesis stages may be a low temperature Fischer-Tropsch hydrocarbon synthesis stage operating at a temperature of less than 280° C. Typically, in such a low temperature Fischer-Tropsch hydrocarbon synthesis stage, the hydrocarbon synthesis stage operates at a temperature of between 160° C. and 280° C., preferably between 220° C. and 260° C., e.g. about 250° C. Such a low temperature Fischer-Tropsch hydrocarbon synthesis stage is thus a high chain growth, typically slurry bed, reaction stage, operating at a predetermined operating pressure in the range of 10 to 50 bar(g), typically below 45 bar(g).

One or more of the Fischer-Tropsch hydrocarbon synthesis stages may be a high temperature Fischer-Tropsch hydrocarbon synthesis stage operating at a temperature of at least 320° C. Typically, such a high temperature Fischer-Tropsch hydrocarbon synthesis stage operates at a temperature of between 320° C. and 380° C., e.g. about 350° C., and at an operating pressure in the range of 10 to 50 bar(g), typically below 45 bar(g). Such a high temperature Fischer-Tropsch hydrocarbon synthesis stage is a low chain growth reaction stage, which typically employs a two-phase fluidised bed reactor. In contrast to the low temperature Fischer-Tropsch hydrocarbon synthesis stage, which may be characterised by its ability to maintain a continuous liquid product phase in a slurry bed reactor, the high temperature Fischer-Tropsch hydrocarbon synthesis stage cannot produce a continuous liquid product phase in a fluidised bed reactor.

The synthesis gas generation stage may be a gasification stage gasifying a solid carbonaceous feedstock, e.g. coal. Any conventional gasification technology may be employed, although it is preferable that gasifiers with an exit gas temperature of at least 900° C. be used. Instead, the synthesis gas generation stage may be a reforming stage, reforming a gaseous hydrocarbonaceous feedstock, e.g. natural gas or associated gas. Any conventional reforming technology may be used.

The process of the invention may include further cooling the synthesis gas after heat has been transferred from the hot synthesis gas to the reject stream of oxygen-depleted air. In this way, the synthesis gas can be cooled to a temperature suitable for further processing of the synthesis gas, e.g. in said hydrocarbon synthesis stage. Further cooling of the synthesis gas may include generating steam.

Figure 1:
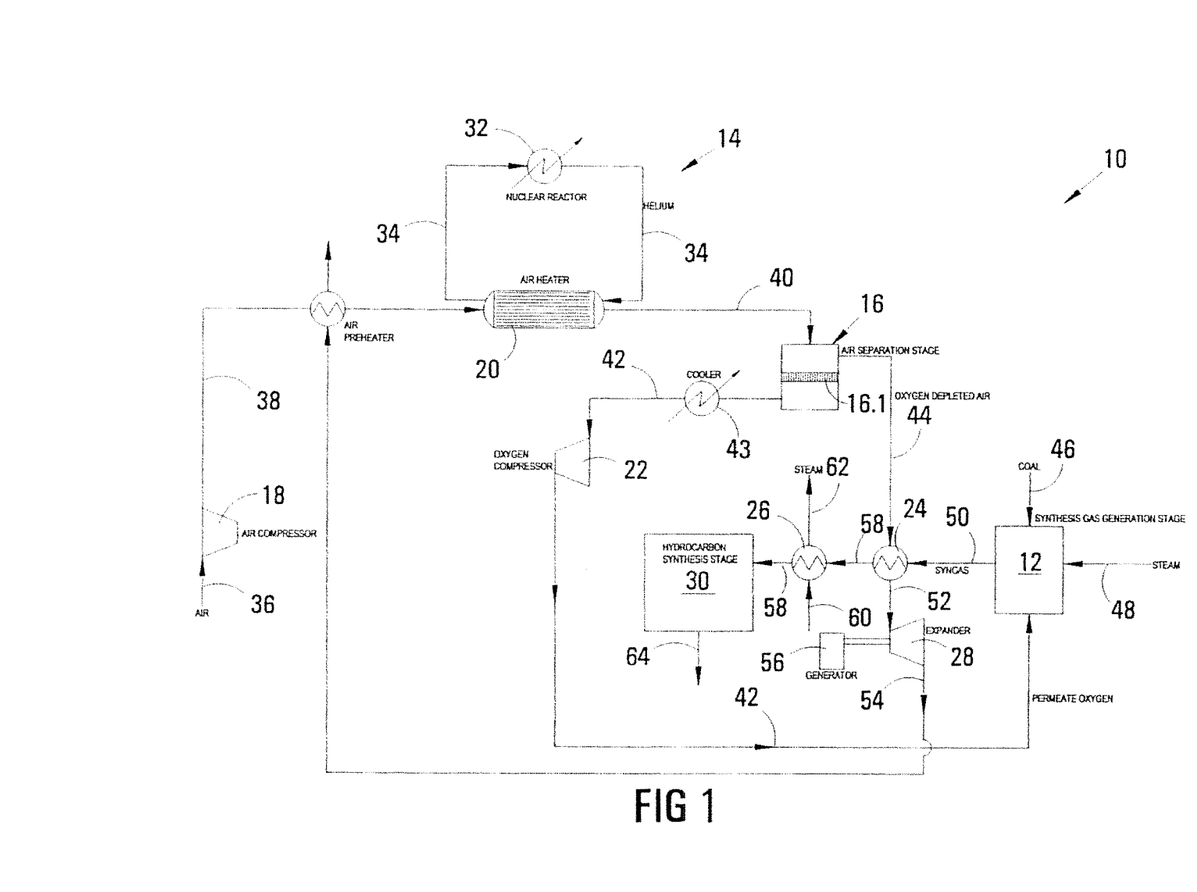
FIG. 1 shows one embodiment of a process in accordance with the invention for co-producing synthesis gas and power.

Referring to FIG. 1 of the drawings, reference numeral 10 generally indicates a process in accordance with the invention for co-producing synthesis gas and power. The process 10 includes, broadly, a synthesis gas generation stage 12, a nuclear reaction stage 14 and an air-separation stage 16 comprising at least one ion transport membrane 16.1.

The process 10 further includes an air-compressor 18, an air heater 20, an oxygen compressor 22, a synthesis gas cooler 24, a synthesis gas waste heat boiler 26, a gas turbine expander 28 and a hydrocarbon synthesis stage 30.

The nuclear reaction stage 14 employs a high temperature gas cooled nuclear reactor 32 with helium as a gaseous coolant being circulated through the high temperature gas cooled nuclear reactor 32. The nuclear reaction stage 14 may be a typical or conventional high temperature gas cooled nuclear reaction stage operating with helium at a pressure of 70 bar(g) in a closed helium cycle 34. In the drawings, the nuclear reaction stage 14 is shown in a very simplified format with most of the detail of such a typical nuclear reaction stage not being shown. However, it is to be noted that the helium in the closed helium cycle 34 is heated in the high temperature gas cooled nuclear reactor 32 to a temperature sufficient such that the helium is at a temperature of about 900° C. where the helium enters the air heater 20.

An air stream 36 is sucked into the air compressor 18 and compressed to a pressure of about 15 bar(g), producing a compressed air stream 38. In the air heater 20, heat is transferred from the closed helium cycle 34 of the nuclear reaction stage 14 to the compressed air stream 38, in indirect heat transfer fashion, producing a heated compressed air stream 40 at a temperature of at least about 700° C. Preferably, the heated compressed air stream 40 is however at a higher temperature, e.g. about 850° C.

The heated compressed air stream 40 is separated in the air separation stage 16, by means of the ion transport membrane 16.1, to produce a permeate stream 42 consisting predominantly of oxygen, i.e. typically at least about 98% by volume oxygen, and a reject stream 44 of oxygen-depleted air. As will be appreciated, the reject stream of oxygen-depleted air 44 is substantially at the same pressure as the heated compressed air stream 40, i.e. at about 15 bar(g) minus the pressure drop across the air heater 20 and the air separation stage 16.

The permeate stream 42 is at a pressure of about 1 bar(g) and is first cooled in a permeate stream cooler 43 before being compressed by means of the oxygen compressor 22 to a pressure suitable for use in the synthesis gas generation stage 12. Typically, the permeate stream 42 is thus compressed to a pressure between about 40 bar(g) and about 50 bar(g), e.g. about 45 bar(g).

In the synthesis gas generation stage 12, coal from a coal feed 46 is gasified in the presence of oxygen, from the permeate stream 42 and in the presence of steam from a steam feed 48, to produce hot synthesis gas 50. The hot synthesis gas 50 is at a temperature of at least 900° C.

The process of the invention is not restricted to a particular technology being employed to produce the hot synthesis gas 50, the only requirement being that the hot synthesis gas 50 must be at a sufficiently high temperature, e.g. at a temperature of at least 900° C. The synthesis gas generation stage 12 may thus generate synthesis gas from coal by gasification with oxygen and steam, as shown in FIG. 1, e.g. by using a fine coal high temperature gasifier, or instead the synthesis gas generation stage 12 may be a reforming stage in which methane is reformed with oxygen or with steam. The synthesis gas generation stage 12 may also be an autothermal reforming stage. For all of these technologies however, oxygen is required and for the process 10 would be provided by the permeate stream 42, once compressed by the oxygen compressor 22.

The hot synthesis gas 50 is cooled in the synthesis gas cooler 24 in indirect heat transfer fashion, thereby heating the reject stream 44 of oxygen-depleted air. Preferably, the hot synthesis gas 50 is at a temperature of about 1300° C., with the reject stream 44 then being heated to a temperature of about 1200° C. A heated reject stream 52 of oxygen-depleted air is thus provided. As will be appreciated, the heated reject stream 52, at a temperature of about 1200° C. and a pressure of about 15 bar(g), can be used to generate power. The heated reject stream 52 is thus expanded through the gas turbine expander 28, for producing an at least partially expanded reject stream 54 of oxygen-depleted air. The gas turbine expander 28 is used to drive a generator 56, thereby generating electrical power.

The hot synthesis gas 50 is cooled in the synthesis gas cooler 24. Cooled synthesis gas 58 is fed to the synthesis gas waste heat boiler 26 where it is further cooled, before the cooled synthesis gas 58 is fed to the hydrocarbon synthesis stage 30. The synthesis gas waste heat boiler 26 receives boiler feed water 60 and produces steam 62, which can be used to generate power or which can be used for process purposes, e.g. in the synthesis gas generation stage 12 as the steam feed 48.

The hydrocarbon synthesis stage 30 may be any hydrocarbon synthesis stage employing a synthesis gas to synthesise hydrocarbons 64. For example, the hydrocarbon synthesis stage may be a methanol synthesis stage or a Fischer-Tropsch hydrocarbon synthesis stage.

Figure 2:
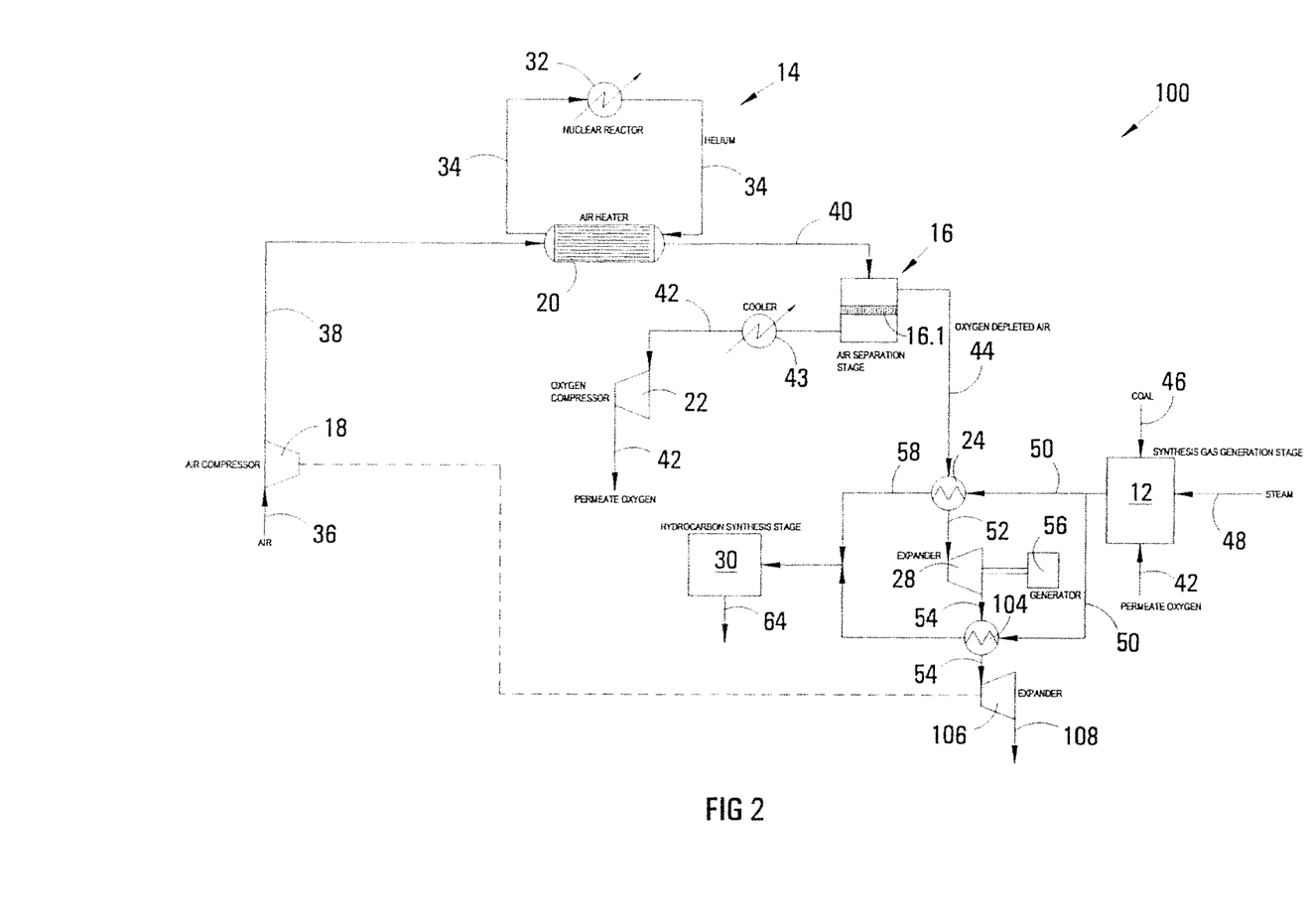
FIG. 2 shows another, more complicated embodiment of a process for processing synthesis gas and power in accordance with the invention.

Referring to FIG. 2 of the drawings, reference numeral 100 shows another embodiment of a process in accordance with the invention for co-producing synthesis gas and power. The process 100 is similar to the process 10 and unless otherwise indicated, the same reference numerals are used in relation to the process 100 as were used in relation to the process 10, to indicate the same or similar process features.

The process 100 employs reheating of the working fluid of the Brayton power cycle, i.e. the reject stream 44. The process 100 thus has a reject stream reheater 104 and another gas turbine expander 106. The hot synthesis gas 50 splits into two streams, one going to the synthesis gas cooler 24 and one going to the reject stream reheater 104, before rejoining and entering the hydrocarbon synthesis stage 30.

In the process 100, the heated reject stream 52 is expanded in stages, first through the gas turbine expander 28 and then through the gas turbine expander 106, producing an expanded reject stream 108. One of the hot synthesis gas streams 50 is used to reheat the at least partially expanded reject stream 54 from the gas turbine expander 28 before the at least partially expanded reject stream 54 is expanded in the gas turbine expander 106.

As shown in FIG. 2, the gas turbine expander 106 can be used to drive the air compressor 18. Such a drive arrangement would typically make use of a direct mechanical coupling between the gas turbine expander 106 and the air compressor 18.

The use of the reheater 104 and expansion of the heated reject stream 52 in stages, increases the efficiency of the Brayton power cycle of the process 100.

Figure 3:
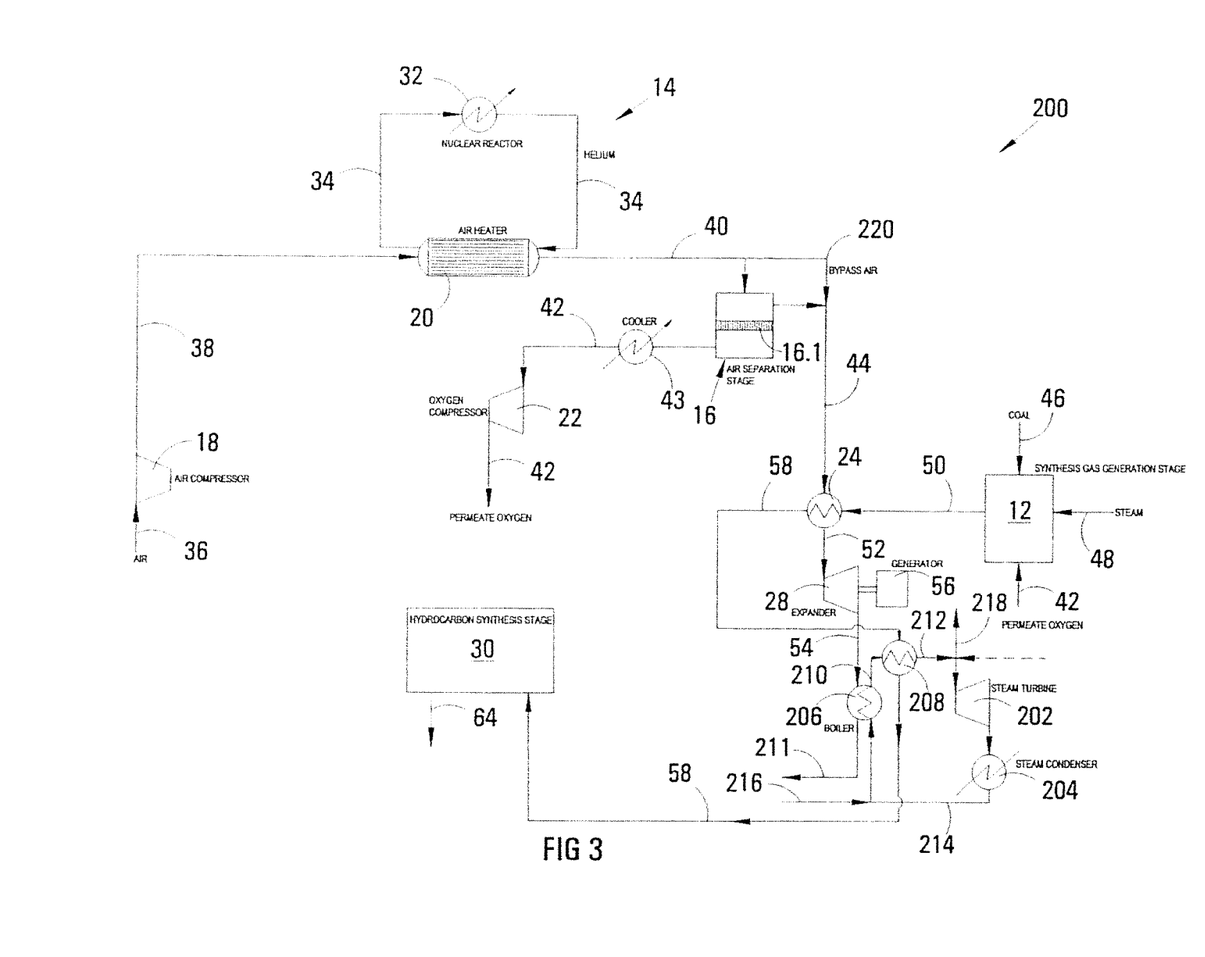
FIG. 3 shows an alternative embodiment of a process in accordance with the invention for producing synthesis gas and power and heat.

With reference to FIG. 3, reference numeral 200 shows an alternative embodiment of a process in accordance with the invention for co-producing synthesis gas and power, and heat. Again, as there are many similarities between the process 200 and the process 10, the same reference numerals have been used as far as possible to indicate the same process features.

The process 200 includes a boiler 206, a superheater 208, a steam turbine 202 and a steam condensor 204. The steam turbine 202, condensor 204, boiler 206 and superheater 208 form part of a Rankine bottoming cycle which works with a Brayton topping cycle to generate steam (i.e. heat) and power, where the Brayton topping cycle includes the air heater 20, synthesis gas cooler 24 and gas turbine expander 28.

In the process 200, the at least partially expanded reject stream 54 is cooled in the boiler 206, producing steam 210 and a cooled reject stream 211. The steam 210 is superheated in the superheater 208 in indirect heat transfer fashion with the cooled synthesis gas 58, producing a superheated steam 212. A portion of the superheated steam 212 is passed through the steam turbine 202 to generate power. This portion of the steam is fully condensed in the steam condensor 204 and condensate 214 is returned to the boiler 206. Boiler feed water make-up 216 is added to the condensate 214. A portion of the superheated steam 212, indicated by reference numeral 218, is withdrawn and used for process purposes, such as process heating.

As also shown in FIG. 3, the air compressor 18 is sized to compress air in addition to what is required to produce the permeate stream 42, i.e. to compress air in addition to the oxygen requirement of the synthesis gas generation stage 12. The additional compressed air is not passed through the air separation stage 16, although the additional compressed air is heated in the air heater 20. In other words, a bypass stream 220 of the heated compressed air stream 40 bypasses the air separation stage 16. This bypass stream 220 is used to generate additional power in the gas turbine expander 28.

Figure 4:
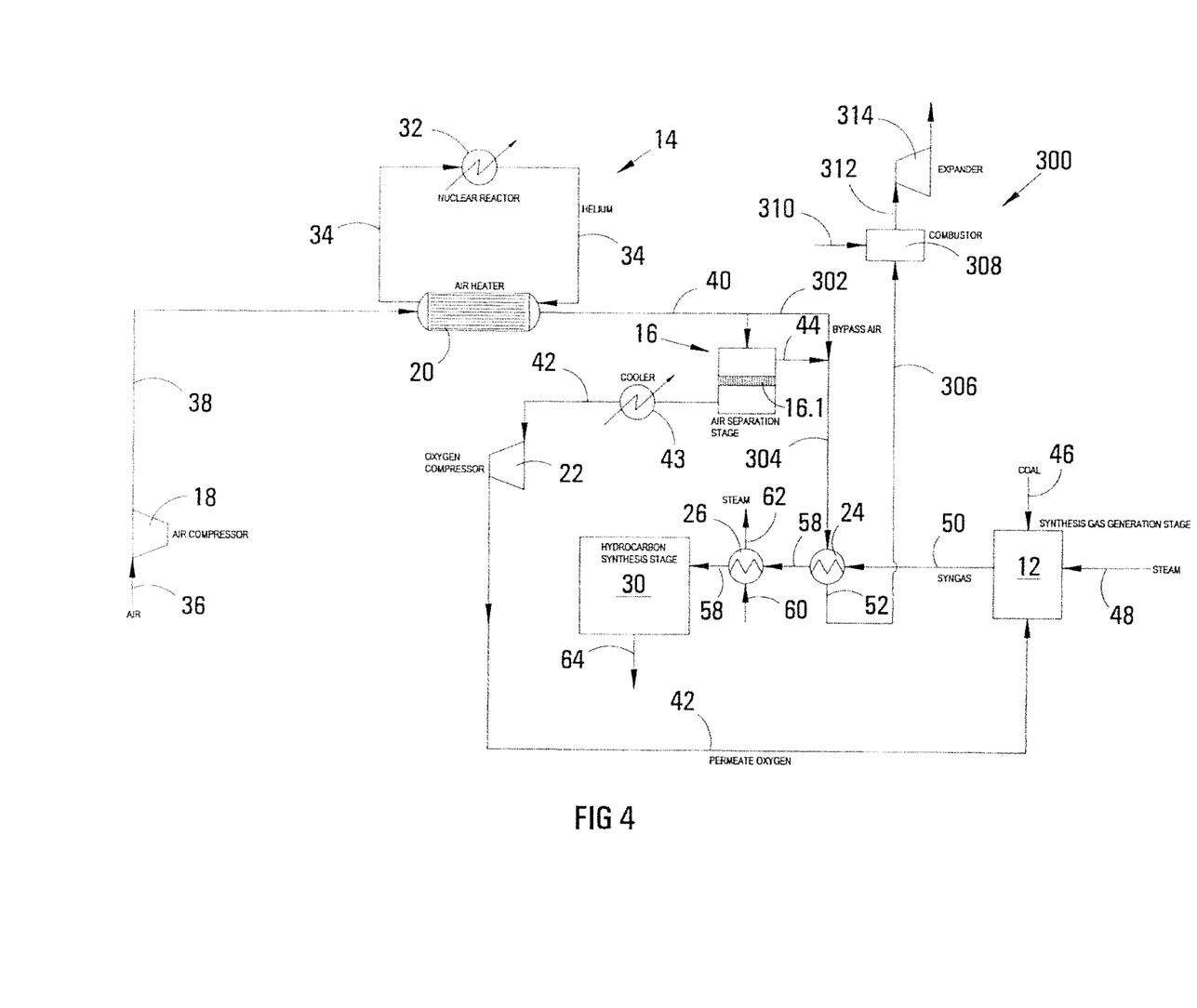
FIG. 4 shows a further embodiment of a process in accordance with the invention for co-producing synthesis gas and power.

FIG. 4 shows a further embodiment of a process in accordance with the invention for co-producing synthesis gas and power, the process generally being indicated by reference numeral 300. As with FIGS. 2 and 3, FIG. 4 also uses the same reference numerals as were used in FIG. 1 to indicate the same or similar process features, unless otherwise indicated.

As is the case with the process 200, in the process 300 the air compressor 18 is sized to compress air in addition to what is required to produce the permeate stream 42 for oxygen supply to the synthesis gas generation stage 12. The additional compressed air is heated also in the air heater 20 and then bypasses the air separation stage 16, as a bypass stream 302, to join the reject stream 44. A combined hot gas stream

304, at a temperature of about 850° C., is then passed through the synthesis gas cooler 24 and heated to a temperature of about 1200° C. A heated combined hot gas stream 306 from the synthesis gas cooler 24 is fed to a combustor 308 where the heated combined hot gas stream 306 is mixed with fuel gas 310. This mixture is combusted in the combustor 308 to produce combusted gas 312 which is then expanded through a gas turbine expander 314 to produce additional power.

A particular advantage of the process of the invention, as illustrated, is that it relies on well-established technology for power production, namely air compressors and gas turbines, and possibly entirely conventional nuclear reaction stages in the case of the preferred embodiment using nuclear heat. There is also economy of scale for production of power since one cycle uses heat from both the nuclear reaction stage and from the heat available in the hot synthesis gas, in contrast to a stand-alone nuclear plant and a stand-alone steam generation system used to cool hot synthesis gas.

The process of the invention, as illustrated, provides a solution to more than one problem, namely the perceived lack of integration opportunities of nuclear energy with synthesis gas generation processes, the large temperature difference driving force associated with steam production using hot synthesis gas (i.e. by matching this heat available at temperatures above 900° C., with the hot, pressurised oxygen-depleted stream emanating from an ITM oxygen process to further increase the energy that can be extracted from this stream), the large power requirement of traditional cryogenic air separation units for oxygen production, the heating requirement for an ITM system as well as the carbon dioxide emission problem associated with synthesis gas production processes for large scale chemicals production. The reduced carbon dioxide emissions result from improvement of thermal efficiency and by substitution of conventional carbon based power and heat generation facilities with a non-carbon source, namely nuclear energy.

The invention claimed is:

1. A process for co-producing synthesis gas and power, the process including in a synthesis gas generation stage, producing a synthesis gas comprising at least CO and $H_2$ by reacting a hydrocarbonaceous feedstock with oxygen, the synthesis gas being at a first temperature;
   in an air separation stage, separating air from a compressed air stream by means of at least one ion transport membrane unit thereby producing a permeate stream consisting predominantly of oxygen and a reject stream of oxygen-depleted air at a second temperature which is lower than the first temperature;
   indirectly heating the reject stream of oxygen-depleted air with the synthesis gas and at least partially expanding said heated reject stream of oxygen-depleted air through at least one turbine to generate power, producing an at least partially expanded reject stream of oxygen-depleted air;
   recompressing the permeate stream consisting predominantly of oxygen to a pressure suitable for use in the synthesis gas generation stage;
   feeding at least a portion of the recompressed permeate stream consisting predominantly of oxygen to the synthesis gas generation stage to provide oxygen for production of synthesis gas; and
   producing carbon based chemicals from the synthesis gas produced by the synthesis gas generation stage.

2. The process as claimed in claim 1, in which the synthesis gas produced in the synthesis gas generation stage is at a temperature of at least 900° C., and the reject stream of oxygen-depleted air is available at a temperature of at least 600° C., but less than the temperature of the synthesis gas produced in the synthesis gas generation stage.

3. The process as claimed in claim 1, which includes heating the compressed air stream to a temperature of at least 700° C. prior to separation of the compressed air stream in the air separation stage, the compressed air stream being heated at least by transferring heat from a nuclear reaction stage.

4. The process as claimed in claim 1, which includes reheating the reject stream of oxygen-depleted air at least once, after partial expansion of the reject stream of oxygen-depleted air through said at least one turbine, and further expanding the reheated reject stream of oxygen-depleted air through at least one further turbine, in order to increase the efficiency of power generation.

5. The process as claimed in claim 1, which includes cooling said at least partially expanded reject stream of oxygen-depleted air, after it has been used for power generation, in heat transfer relationship with the compressed air stream.

6. The process as claimed in claim 1, in which the heated reject stream of oxygen-depleted air is heated to a temperature of at least 900° C. by indirect heating with the synthesis gas.

7. The process as claimed in claim 1, in which the air is compressed in one or more air compressors sized to compress air in addition to what is required to produce the permeate stream consisting predominantly of oxygen in the air separation stage for synthesis gas generation purposes, the additional compressed air bypassing the ion transport membrane unit and being heated before being used to produce additional power.

8. The process as claimed in claim 7, in which the additional compressed air receives heat from the synthesis gas.

9. The process as claimed in claim 7, in which fuel gas is burned with the additional compressed air producing combusted gas, with the combusted gas being expanded to produce power.

10. The process as claimed in claim 9, in which the additional compressed air is first mixed with the reject stream of oxygen-depleted air and fuel before the mixture is combusted to produce combusted gas, with the combusted gas then being expanded through a gas expansion turbine to generate power.

11. The process as claimed in claim 1, which includes in a hydrocarbon synthesis stage, producing hydrocarbons from the synthesis gas produced by the synthesis gas generation stage.

12. The process as claimed in claim 7, which includes heating the compressed air stream to a temperature of at least 700° C. prior to separation of the compressed air stream in the air separation stage and in which the compressed air stream is heated at least by transferring heat from a nuclear reaction stage, and in which the additional compressed air receives heat from the nuclear reaction stage.

* * * * *